Sept. 27, 1966     D. S. CHISHOLM     3,275,231

BEARING

Filed Jan. 2, 1964

INVENTOR.
Douglas S. Chisholm
BY Robert B. Ingraham
AGENT
Jerome Rudix
ATTORNEY 3,275,231
BEARING
Douglas S. Chisholm, Midland, Mich., assignor to The Dow Chemical Company, Midland, Mich., a corporation of Delaware
Filed Jan. 2, 1964, Ser. No. 335,266
4 Claims. (Cl. 233—24)

This invention relates an an improved bearing. It more particularly relates to an improved thrust bearing and a thrust bearing and drive.

In the known art there is considerable difficulty encountered in providing suitable bearings for centrifuges, centrifugal extruders, cutters, gyroscopes, and the like wherein any wear of the radial bearings could develop serious unwanted vibration and lead to even greater wear and oftentimes dangerous vibration. Therefore, such bearings must be replaced frequently and maintained in excellent condition if high speed operation is to be maintained. Also wear producing radial force is applied in conventional drive systems wherein direct gear, belt driving or single jet turbine drive is utilized.

It is an object of this invention to provide an improved combination of thrust and radial bearing or rotational apparatus.

A further object of this invention is to provide a high speed bearing which is tolerant of wear.

A further object of the invention is to provide an improved drive wherein conventional radial bearings are subjected to significantly less wear than in conventional applications.

A further object of the invention is to provide a bearing which minimizes heat transfer from the rotating spindle to the bearings.

The benefits and other advantages in accordance with the present invention are achieved in a bearing assembly comprising a member to be rotated, said member defining a section having a conical surface, said surface being projectable to a point A, at least three rotatably mounted conical segments positioned at about equal angular displacements from each other about said conical portion, each of the conical segments having surfaces which are projectable to the point A and adapted to be in engagement with the conical member to be rotated, rotatable bearing means in cooperative combination with the conical sections and means to maintain the conical section in fixed relationship to each other.

Further features and advantages of the present invention will become more apparent from the following specification take in connection with the drawing wherein.

Figure 1:
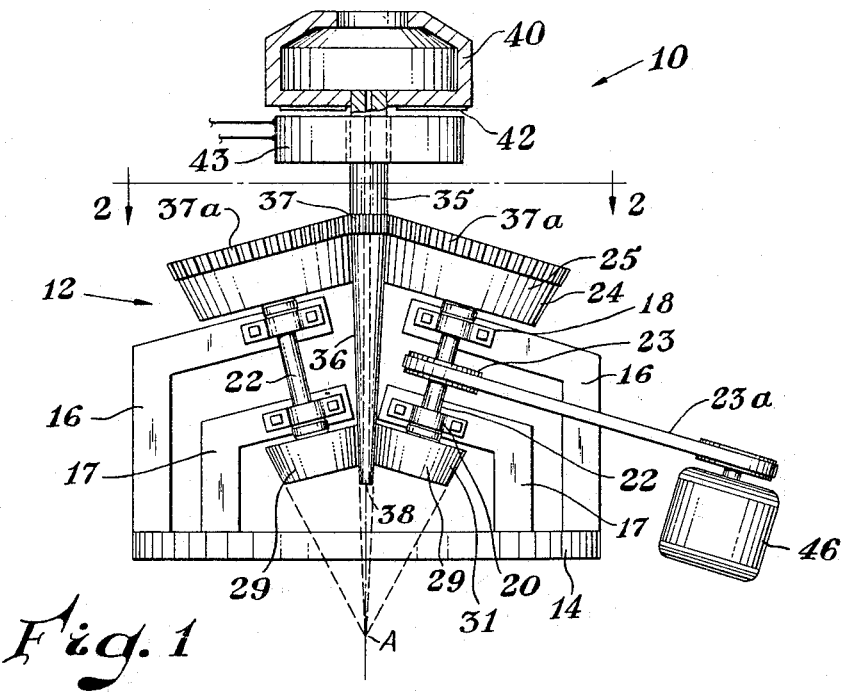
FIGURE 1 is a schematic representation of a bearing in accordance with the invention.

In FIGURE 1 there is a schematically illustrated a centrifuge assembly 10 incorporating a bearing 12 in accordance with the present invention. The bearing 12 comprises a frame or support means 14. Rigidly affixed to the support means or frame 14 are three bearing supports 16 and three bearing supports 17. The bearing support 16 carries a bearing 18. A bearing 20 is disposed within the bearing supports 17. The bearings 18 and 20 are axially aligned and carry a shaft 22 rotatably disposed therein. A drive means or pulley 23 is affixed to at least one of the shafts 22 and is driven by the belt 23A. A right conical segment 24 is affixed to the portion of the shaft 22 generally adjacent the bearing 18. The conical sections 24 have shaft engaging faces 25. Oppositely disposed on the shaft 22 is a second right conical section 29 affixed to the portion of the shaft 22 adjacent the bearing 20. The conical section 29 has a bearing surface 31. The bearing surfaces 25 and 31 lie on the surface of an imaginary cone which terminates at point A and also point A is a point on the projected axis of the shaft 22. The bearing members 16 and 17 are disposed about a central axis in generally equiangular relationship and the projected center lines of the shafts 22 also lie on the surface of a cone which terminates at point A. A rotatable member 35 is provided with a conical portion 36 whose surface lies on a cone whose apex is the point A. A gear 37 is diposed on the shaft 35 and is in mating engagement with a gear 37a rigidly affixed to the driven shaft 22. The shaft 35 defines a central cylindrical passageway 38. A basket 40 is affixed to the shaft 35. A conductive element 42 is affixed to one surface of the basket 40. Adjacent to the conductive element 42 is an induction heating coil 43.

Figure 2:
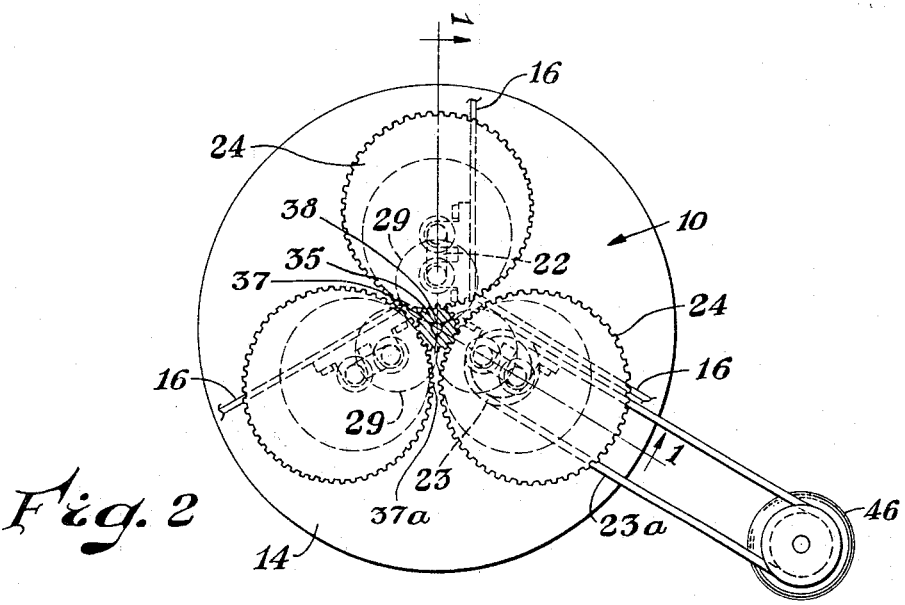
FIGURE 2 is a second schematic view of a bearing in accordance with the invention viewed parallel to the axis of the rotating shaft.

FIGURE 2 shows a schematic representation of a view of the assembly of FIGURE 1 along the line 2—2 showing the angular relationship between the conical sections 24 and the shaft 35. The driving means or belt 23a is in operative contact with a power source or motor 46.

Operation of bearing assemblies in accordance with the present invention is readily understood by referring to FIGURES 1 and 2. The bearings in accordance with the invention comprise a central driven conical member such as the conical shaft 36 rotatably supported by three conical members such as the assemblies comprising the conical sections 24 and 25, which are supported on the shafts 22. Each of these conical sections have surfaces which if extended have their apexes at a common point. Optionally, the gears 37 and 37a are utilized if high starting or stopping torque is required.

Advantageously by selection of conical sections having a suitable solid angle, a wide variety of needs may be met. In the embodiment illustrated in FIGURES 1 and 2, the shaft or mandrel 35 is supported at 6 points of contact by means of conical driving or idling elements which have substantially greater diameter than the driven shaft. The load presented to these elements is supported by the bearings 18 and 20, thus providing at least three bearings and as illustrated, six bearings to support the rotatable assembly. Rotation of one or more of the supporting conical drive members such as is made up from the sections 24, 25, and the shaft 22 results in rotation of the shaft 35. Adequate frictional engagement is obtained by mounting the assembly in such a manner that gravity maintains the shaft 35 in position or alternately a suitable means can be provided for urging the shaft into the desired engagement with the conical supporting members. Such a means may be a spring or a predetermined loading applied by means of any convenient lever system.

Usually it is desirable that the spherical angle of the tapered surface of the driven member be not more than 45 degrees and preferably not more than 30 degrees. Shafts having conical surfaces of smaller spherical angle are readily employed. Generally, the minimum spherical angle desirable for most applications is about 3 degrees and preferably about 8 degrees. The radial bearing load is rapidly increased as the smaller angles are employed and the thrust capabilities of the assemblies reduces. High thrust loads are most economically accommodated utilizing the shafts having the larger angles. The driven member is more readily retained in the assembly when the smaller angles are employed. The larger angle shows particular advantage when there is a possibility that the bearing will operate under conditions where there is a strong likelihood that foreign material may pass between any of the operating surfaces.

Centrifuges constructed substantially in accordance with the drawing are found to operate at high speed with a minimum of bearing wear. They are found to be exceptionally free from undesired vibration. When such a centrifuge is improperly loaded resulting in unbalance, high speeds can not be achieved, as the unbalance appears to prevent proper contact of the driven shaft with the driving mechanism.

The apparatus does not appear to be adversely affected by the presence of particulate plastic material passing between the driving and driven elements.

As is apparent from the foregoing specification, the manufacture of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

I claim:

1. A bearing assembly comprising a member to be rotated, said member defining a section having a conical surface, said surface being projectable to a point A, at least three rotatably mounted conical segments positioned at about equiangular displacements from each other about said conical portion, each of the conical segments having conical surfaces in the same conical projection which are projectable to the point A and in engagement with conical surface of the conical member to be rotated, rotatable bearing means in cooperative combination with the conical sections, and means to maintain the conical sections in fixed relationship to each other.

2. The bearing assembly of claim 1, wherein at least one of the conical sections has in association therewith means to cause rotation thereof other than the conical section to be rotated.

3. The bearing assembly of claim 2 wherein a plurality of the conical segments are rotated by means of external power.

4. A centrifugal device comprising a basket to be rotated about an axis, said basket having a generally vertical axis of rotation, a downwardly dependent conical shaft affixed to said axis and having its axis of generation co-linear with the axis of rotation of the basket, at least three rotatably mounted conical segments positioned at about equiangular displacements from each other about the dependent conical shaft, the conical surfaces in the same conical projection of said conical segments being projectable to a point A, said conical shaft in engagement with the conical surfaces of the conical segments, the conical surface of the conical shaft when in engagement with the conical segments being projectable to point A, means to provide rotation of at least one of the conical segments.

References Cited by the Examiner

UNITED STATES PATENTS

| | | | |
|---|---|---|---|
| 1,050,720 | 1/1913 | De Raasloff et al. | 233—24 X |
| 1,566,770 | 12/1925 | Parker | 233—25 X |

M. CARY NELSON, *Primary Examiner.*

HENRY T. KLINKSIEK, *Examiner.*